(12) United States Patent
Asur et al.

(10) Patent No.: US 8,793,258 B2
(45) Date of Patent: Jul. 29, 2014

(54) PREDICTING SHARING ON A SOCIAL NETWORK

(75) Inventors: Sitaram Asur, Mountain View, CA (US); Bernardo Huberman, Palo Alto, CA (US); Roja Bandari, Los Angeles, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 31 days.

(21) Appl. No.: 13/563,574

(22) Filed: Jul. 31, 2012

(65) Prior Publication Data

US 2014/0040277 A1    Feb. 6, 2014

(51) Int. Cl.
*G06F 17/30* (2006.01)

(52) U.S. Cl.
USPC .......................................................... 707/748

(58) Field of Classification Search
USPC ................................. 707/748–751
See application file for complete search history.

(56) References Cited

U.S. PATENT DOCUMENTS

| | | | | |
|---|---|---|---|---|
| 6,466,918 | B1* | 10/2002 | Spiegel et al. | 705/7.29 |
| 7,568,148 | B1* | 7/2009 | Bharat et al. | 715/200 |
| 8,156,115 | B1* | 4/2012 | Erol et al. | 707/728 |
| 8,176,056 | B1* | 5/2012 | Bharat et al. | 707/749 |
| 8,229,873 | B1* | 7/2012 | Dolan et al. | 706/45 |
| 8,355,955 | B1* | 1/2013 | Mirchandani et al. | 705/26.1 |
| 8,447,760 | B1* | 5/2013 | Tong et al. | 707/728 |
| 2003/0130998 | A1* | 7/2003 | Fox et al. | 707/3 |
| 2005/0210025 | A1* | 9/2005 | Dalton et al. | 707/5 |
| 2008/0168135 | A1 | 7/2008 | Redlich et al. | |
| 2009/0037410 | A1* | 2/2009 | Jones et al. | 707/5 |
| 2010/0017262 | A1* | 1/2010 | Iyer et al. | 705/10 |
| 2010/0280985 | A1 | 11/2010 | Duchon et al. | |
| 2011/0258035 | A1* | 10/2011 | Oren et al. | 705/14.43 |
| 2011/0302103 | A1 | 12/2011 | Carmel et al. | |
| 2011/0307466 | A1* | 12/2011 | Prakash et al. | 707/707 |
| 2012/0011117 | A1* | 1/2012 | Tong et al. | 707/723 |
| 2012/0143665 | A1 | 6/2012 | Swain et al. | |
| 2012/0179764 | A1* | 7/2012 | Erdal | 709/206 |
| 2012/0209838 | A1* | 8/2012 | Dean et al. | 707/725 |
| 2012/0330938 | A1* | 12/2012 | Lee et al. | 707/723 |
| 2013/0097285 | A1* | 4/2013 | van Zwol et al. | 709/219 |
| 2013/0138577 | A1* | 5/2013 | Sisk | 705/36 R |
| 2013/0159826 | A1* | 6/2013 | Mason et al. | 715/205 |
| 2013/0246452 | A1* | 9/2013 | Vadrevu et al. | 707/769 |

OTHER PUBLICATIONS

Bollen et al., "Twitter Mood Predicts the Stock Market," Journal of Computational Science, Feb. 2, 2011, 8 p.
Christopher Horn, "Analysis and Classification of Twitter Messages," Master's Thesis, Apr. 29, 2010, 109 p.
Hong et al., "Predicting Popular Messages in Twitter," WWW 2011-Poster, Mar. 28-Apr. 1, 2011, pp. 67-68.

* cited by examiner

*Primary Examiner* — Cam-Linh Nguyen

(57) ABSTRACT

A non-transitory computer-readable storage device includes instructions that, when executed, cause one or more processors to calculate a score for an article, from a source, using the average number of times other articles belonging to the source were shared on a social network ("t-density"). The processor are further caused to predict, using the score, a number of times the article will be shared on the social network.

20 Claims, 4 Drawing Sheets

PREDICTING SHARING ON A SOCIAL NETWORK

BACKGROUND

Previously, reporting and broadcasting were costly, which meant that large agencies dominated the content creation competition. However, the ease and low cost of online content creation and sharing has changed the rules of the competition, and allowed smaller entities to flourish. As such, large news sources now devote resources to online mediums to disseminate news articles to a growing audience. Most news articles are time sensitive because they reference developing stories. Hence, there is intense competition among news articles to propagate as widely as possible in as short a time as possible.

BRIEF DESCRIPTION OF THE DRAWINGS

For a detailed description of various examples of the invention, reference will now be made to the accompanying drawings in which.

NOTATION AND NOMENCLATURE

Certain terms are used throughout the following description section and claims section to refer to particular system components. However, different entities may refer to a component by different names. This document does not intend to distinguish between components that differ in name but not function. The terms "including" and "comprising" are used herein an open-ended fashion, and thus should be interpreted to mean "including, but not limited to." Also, the term "couple" or "couples" is intended to mean either an indirect, direct, optical, wireless, or electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, a person having ordinary skill in the art will understand that the following description has broad application, and the discussion of any embodiment is meant only to be exemplary of that embodiment, and not intended to intimate that the scope of the disclosure, including the claims, is limited to that embodiment.

Social networks are fertile ground for sharing news articles and other content because the person sharing the content (or the link to the content) adds his or her own credibility to the credibility of the content creator. Furthermore, the person sharing the content need only click once on a "share," "like," "+1," or "tweet" button to share the content with hundreds or thousands of followers simultaneously. Also, the person receiving the content or link need only click once to immediately read or view the content. Consequently, social networks such as TWITTER, FACEBOOK, and GOOGLE+ have gained a foothold in the news industry as gatekeepers for news content despite not employing reporters or content creators. Accurately predicting the extent to which a news article will spread is valuable to journalists, content providers, advertisers, and news recommendation systems. It is desirable to predict the popularity of news articles, or any content, prior to release rather than during the propagation period.

Figure 1:
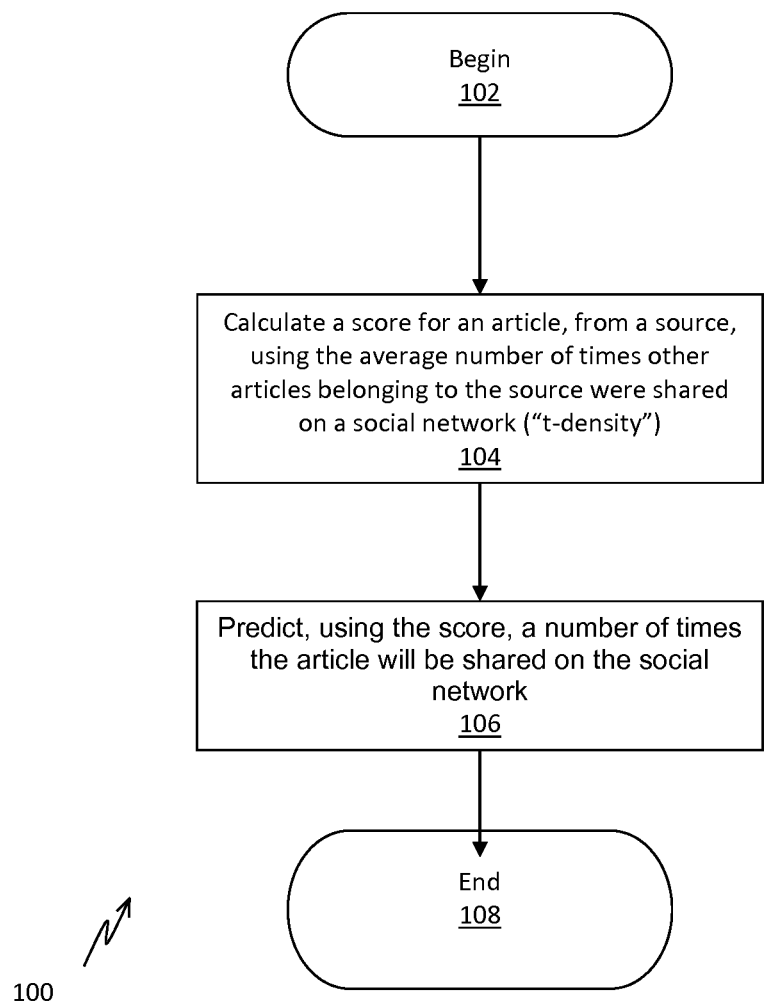
FIG. 1 illustrates a method of predicting sharing on a social network in accordance with at least some illustrated examples.

FIG. 1 illustrates a method 100 of predicting sharing on a social network beginning at 102 and ending at 108. As mentioned, social networks are services over which content can be shared. For example, a person may share a news article over a social network such as TWITTER by tweeting a link to the news article. That person's followers receive the tweet through the social network platform and may select the link to read the news article in, e.g., a browser. In at least one example, the method 100 is performed prior to publishing a news article from a particular source or content creator. At 104, a score is calculated for the unpublished article using the average number of times other articles from the same source were shared on a particular social network. This average number of times may be called the "t-density" for the source, and in at least one example, articles from the source receiving no shares are not used in the calculation of t-density. Multiple social networks may be analyzed in at least one example. For example, if the source was the WALL STREET JOURNAL, the t-density may be the average number of times other articles provided by the WALL STREET JOURNAL was liked on FACEBOOK and tweeted on TWITTER in the last month.

Such an average may be calculated using historical data provided by a database. In at least one example, the method 100 includes creating and maintaining such a database and using it to train and maintain a prediction model. For example, activities over the social network may be recorded to be used as the training data for prediction. Some information that may be recorded includes: the name of the news source that generates the article, the category or type of news in the article, the subjectivity of the language in the article, the number of times the article is shared, the named entities (discussed below) mentioned in the article, the profiles of the sharers and followers, the geographical and temporal evolution of shared articles (e.g., the chain of shares from one follower to the next over time), and similar metrics.

Each of these types of historical data may be quantified by a score making use of different scoring functions such as regression analysis, classification methods, filters, and other statistical, cleaning, smoothing, and noise-reducing functions. For example, certain metrics may benefit from smoothing via passing the measurements through a low-pass filter. As another example, the t-density of a source may be weighted by the percentage of times a source's t-density is above the mean t-density of all sources. Sources that drop below the mean t-density of all sources may be penalized by weighting as well. Calculating the article score may include multiplying the t-density by a percentage of times the t-density is above the average t-density of multiple sources in at least one example. These scoring functions may also be used on combinations of the types of historical data.

The t-density for a source may be restricted by a particular number of previous days. In at least one example, the particular number is 54. In another example, the particular number is 50. These numbers may be chosen based on the lifespan of an average number of articles on the social network. The lifespan of an article may begin when the article is published and end when the article has been shared for the last time. As the average lifespan increases or decreases, the particular number may be changed accordingly.

At 106, the number of times the article will be shared on the social network is predicted using the calculated score(s). For example, the number of shares for an article may be described by equation (1):

$$T^{0.45} = (0.2S - 0.1\text{Ent}_{ct} - 0.1\text{Ent}_{avg} + 0.2\text{Ent}_{max})^2 \qquad (1)$$

where T is the number of predicted shares for the article, S is the source t-density score from the source of the article, $\text{Ent}_{ct}$ is the number of named entities in the article, $\text{Ent}_{avg}$ is the average score of named entities in the article, and $\text{Ent}_{max}$ is the highest score among the named entities in the article. A named entity is a well-known place, person, or organization. Well-known entities can affect the propagation of an article, increasing its chances of success. A popularity score may be assigned to each named entity by studying the historical prominence of each entity over the social network. The popularity score associated with a named entity is calculated using the average number of times an article in which the named entity appears is shared on the social network within a particular number of previous days or period, e.g., within the last month.

In at least one example, the number of shares may be described by equation (2):

$$T = S^{1.24} C^{0.45} e^{-(0.1 Entmax + 3)} \qquad (2)$$

where T is the number of predicted shares of the article, S is the source t-density score of the source of the article, C is a category density score of the article, and $\text{Ent}_{max}$ is the highest score among the named entities in the article. A category score may be assigned to an article by determining the subject matter of the article, assigning the article a category based on the subject matter, and studying the historical prominence of the category over the social network. The category score associated with an article is calculated using the average number of times an article having the same category appears is shared on the social network within a particular number of previous days or period, e.g., within the last month. Equation (2) may also be written as equation (3):

$$In(T) = 1.24 In(S) + 0.45 In(C) + 0.1 \text{Ent}_{max} - 3 \qquad (3)$$

where T is the number of predicted shares of the article, S is the source t-density score of the source of the article, C is a category density score of the article, and $\text{Ent}_{max}$ is the highest score among the named entities in the article.

In at least one example, predicting the number of times an article is shared includes assigning the article to a class out of a plurality of classes using the score(s). Each class may represent a numerical range. As an example, there may be three popularity classes: Class A represents 1 to 20 shares, Class B represents 20 to 100 shares, and Class C represents more than 100 shares. The variable T, the number of predicted shares of the article, may fall within one of Class A, Class B, or Class C for an unpublished article. The range of each class may be determined in order to maximize the confidence that an article can be assigned to the correct class. The range of each class may change over time as more historical data is collected.

Some types of data recorded may have more impact on the result than others. For example, publication source may currently play a more important role in prediction than subjectivity, categories, and named entities. However, which types of data have the most impact may change over time. As a result equations (1), (2), and (3) may change over time as well. Therefore in various examples, the training data and training frequency are updated periodically or constantly to ensure the changes are taken into account during prediction.

Figure 2:
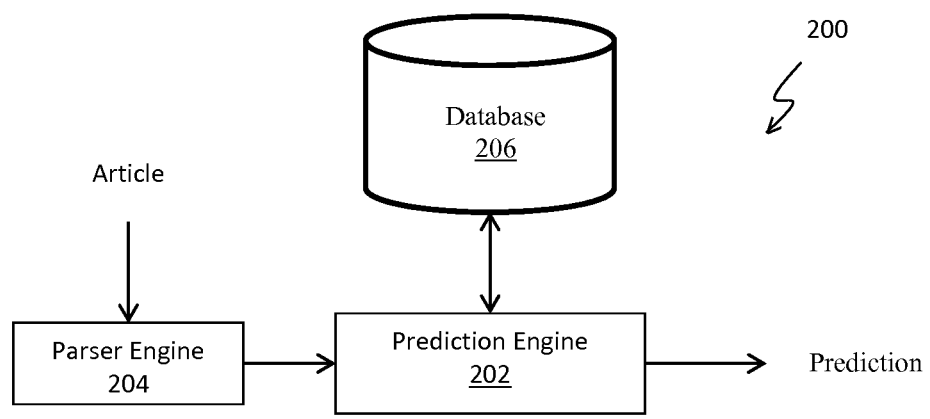
FIG. 2 illustrates a system for predicting sharing on a social network in accordance with at least some illustrated examples.

FIG. 2 illustrates a system 200 of predicting sharing on a social network. The system 200 comprises one or more processors which may be implemented as a parser engine 204 and a prediction engine 202. The processors may be coupled to memory comprising instructions that, when executed, cause the one or more processors to perform any action described herein. The parser engine 204 receives as input an article, parses the article, and outputs information to the prediction engine 202. For example, the parser engine may receive as input an unpublished article from a particular source. In parsing the article, the parser engine 204 may create metadata about the article including extracted named entities, identification of the source, or any other data described above. The parser engine 204 may supply this metadata about the article to the prediction engine 202.

The prediction engine 202 receives data from the parser engine 204 and database 206. In at least one example, the prediction engine 202 may receive metadata about the unpublished article from the parser engine, and the prediction engine 202 may receive historical data from the database 206. For example, the prediction engine 202 may receive the average number of times other articles belonging to the source were shared on a social network ("t-density") from the database 206. Using this and similar data, the prediction engine 202 may solve for the variable T in equations (1), (2), or (3) described above. As such, the prediction engine 202 outputs a prediction of a number a number of times the article will be shared on a particular social network.

Figure 3:
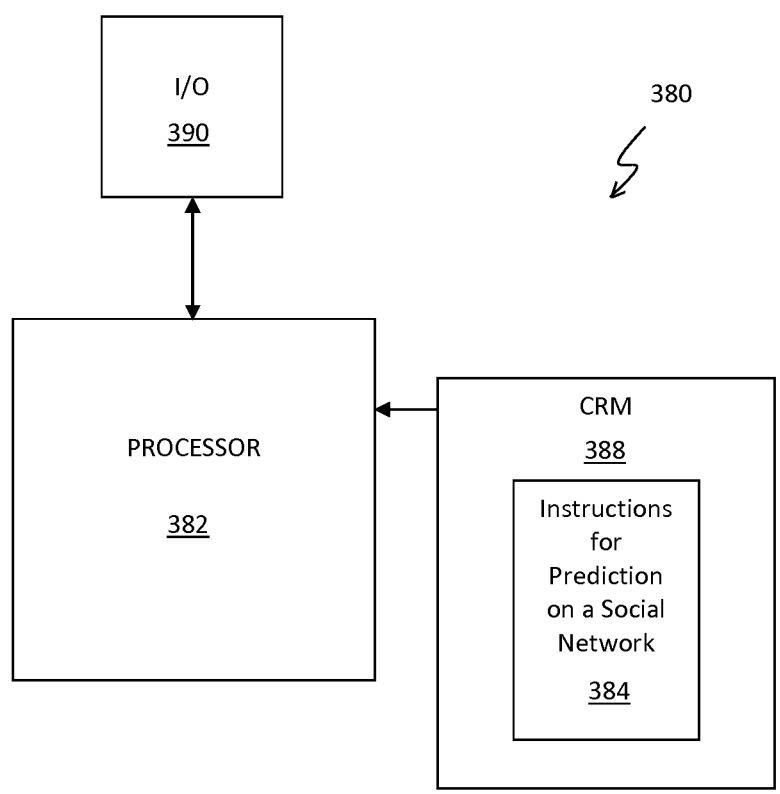
FIG. 3 illustrates a computer readable storage device for predicting sharing on a social network in accordance with at least some illustrated examples.

Prediction sharing on a social network may be implemented on any particular machine or computer with sufficient processing power, memory resources, and throughput capability to handle the necessary workload placed upon the computer. FIG. 3 illustrates a non-transitory computer-readable storage device 380 comprising instructions that, when executed, cause one or more processors 382 to perform any action described herein. The computer system 380 may be suitable for implementing one or more examples disclosed herein. The computer system 380 may include a hardware processor 382 (which may be referred to as a central processor unit or CPU) that is in communication with memory devices including storage 388, and input/output (I/O) 390 devices. The processor may be implemented as one or more CPU chips.

Figure 4:
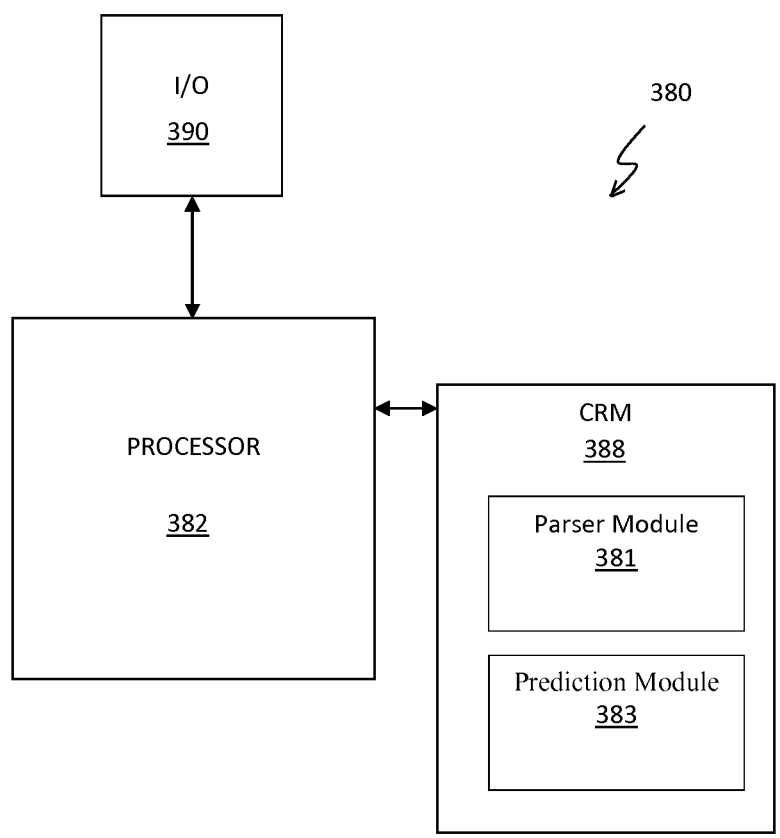
FIG. 4 illustrates another computer readable storage device for predicting sharing on a social network in accordance with at least some illustrated examples.

In various embodiments, the storage 388 may include a non-transitory storage device such as volatile memory (e.g., RAM), non-volatile storage (e.g., Flash memory, hard disk drive, CD ROM, etc.), or combinations thereof. The storage 388 may include computer-readable software 384 that is executed by the processor 382 and comprises instructions for prediction of sharing on a social network described herein. One or more of the actions described herein are performed by the processor 482 during execution of the software 384. FIG. 4 illustrates that the parser engine and prediction engine of FIG. 2 may be implemented as the processor executing software parser module 381 and software prediction module 383.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A non-transitory computer-readable storage device comprising instructions that, when executed, cause one or more processors to:

calculate a score for an article, from a source, using an average number of times other articles belonging to the source were shared on a social network ("t-density");
predict, using the score, a number of times the article will be shared on the social network.

2. The device of claim 1, wherein calculating the score further causes the one or more processors to multiply the t-density by a percentage of times the t-density is above the average t-density of multiple sources.

3. The device of claim 1, wherein using the average number of times comprises using the average number of times other articles belonging to the source were shared on the social network within a particular number of previous days.

4. The device of claim 3, wherein the particular number is 54.

5. The device of claim 1, wherein predicting the number of times comprises assigning the article to a class out of a plurality of classes using the score, each class representing a numerical range, the range of the assigned class including the number of times predicted.

6. The device of claim 1, wherein calculating the score comprises using a number of how many named entities are in the article, a named entity comprising a well-known place, person, or organization.

7. The device of claim 1, wherein calculating the score comprises using a number of how many named entities appear in the article, a named entity comprising a well-known place, person, or organization.

8. The device of claim 1, wherein calculating the score comprises using a popularity score associated with a named entity in the article, a named entity comprising a well-known place, person, or organization, each named entity associated with a popularity score.

9. The device of claim 8, wherein the popularity score associated with a named entity is calculated using the average number of times an article in which the named entity appears is shared on the social network within a particular number of previous days.

10. The device of claim 1, wherein calculating the score comprises using a number of how many named entities appear in the article, a named entity comprising a well-known place, person, or organization.

11. The device of claim 1, wherein calculating the score comprises using an average popularity score of named entities in the article, a named entity comprising a well-known place, person, or organization, each named entity associated with a popularity score.

12. A method, comprising:
calculating, by a processor, a score for an article, from a source, using an average number of times other articles belonging to the source were shared on a social network ("t-density");
predicting, by the processor, using the score, a number of times the article will be shared on the social network.

13. The method of claim 12, wherein calculating the score comprises multiplying the t-density by a percentage of times the t-density is above the average t-density of multiple sources.

14. The method of claim 12, wherein using the average number of times comprises using the average number of times other articles belonging to the source were shared on the social network within a particular number of previous days.

15. The method of claim 12, wherein predicting the number of times comprises assigning the article to a class out of a plurality of classes using the score, each class representing a numerical range, the range of the assigned class including the number of times predicted.

16. The method of claim 12, wherein calculating the score comprises using a number of how many named entities are in the article, a named entity comprising a well-known place, person, or organization.

17. A system, comprising:
a parser engine; and
a prediction engine coupled to the parser engine, the prediction engine to:
calculate a score for an article, from a source, using an average number of times other articles belonging to the source were shared on a social network ("t-density");
predict, using the score, a number of times the article will be shared on the social network.

18. The system of claim 17, wherein the parser engine supplies the prediction engine with metadata parsed from the article.

19. The system of claim 17, wherein using the average number of times comprises using the average number of times other articles belonging to the source were shared on the social network within a particular number of previous days.

20. The system of claim 17, wherein calculating the score comprises using a number of how many named entities are in the article, a named entity comprising a well-known place, person, or organization.

* * * * *